United States Patent
Iwamura

(10) Patent No.: US 8,095,156 B2
(45) Date of Patent: Jan. 10, 2012

(54) USER EQUIPMENT AND METHOD USED IN MOBILE COMMUNICATION SYSTEM

(75) Inventor: Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 215 days.

(21) Appl. No.: 12/521,102

(22) PCT Filed: Dec. 26, 2007

(86) PCT No.: PCT/JP2007/074954
§ 371 (c)(1),
(2), (4) Date: Jun. 24, 2009

(87) PCT Pub. No.: WO2008/081816
PCT Pub. Date: Jul. 10, 2008

(65) Prior Publication Data
US 2010/0029283 A1 Feb. 4, 2010

(30) Foreign Application Priority Data
Jan. 5, 2007  (JP) ................................ 2007-000807

(51) Int. Cl.
*H04W 24/00* (2009.01)
(52) U.S. Cl. .................. 455/457; 455/456.1; 455/422.1
(58) Field of Classification Search .................. None
See application file for complete search history.

(56) References Cited

U.S. PATENT DOCUMENTS

| | | | |
|---|---|---|---|
| 6,801,772 B1 | 10/2004 | Townend et al. | |
| 6,826,414 B1 | 11/2004 | Reynolds et al. | |
| 7,139,566 B2 | 11/2006 | Ko et al. | |
| 2003/0008662 A1 | 1/2003 | Stern et al. | |
| 2004/0048624 A1 | 3/2004 | Ko et al. | |
| 2005/0147060 A1 | 7/2005 | Buckley | |
| 2007/0232317 A1* | 10/2007 | Casati et al. | 455/450 |
| 2008/0102831 A1* | 5/2008 | Ore | 455/435.1 |
| 2008/0102896 A1* | 5/2008 | Wang et al. | 455/560 |
| 2010/0029246 A1* | 2/2010 | Binning | 455/404.2 |

FOREIGN PATENT DOCUMENTS

JP           10-094037 A        4/1998
(Continued)

OTHER PUBLICATIONS

Singapore Written Opinion for Application No. 200904089-0, mailed on Jun. 28, 2010 (9 pages).
(Continued)

*Primary Examiner* — Ajit Patel
(74) *Attorney, Agent, or Firm* — Osha • Liang LLP

(57) ABSTRACT

User equipment used in a mobile communication system is disclosed that includes a specifying unit specifying a tracking area of a serving cell based on broadcast information, a determination unit determining whether the user equipment is entitled to communicate in the private network, and a transmission unit transmitting a signal requesting to update the tracking area to a base station of the serving cell, in which the determination unit determines whether the specified tracking area is for the private network by checking a common identification which is common to private networks, and the determination unit determines whether the user equipment is entitled to communicate in the private network by determining whether the private network to which the serving cell belongs is the same as or different from a private network in which the user equipment is entitled to communicate.

18 Claims, 8 Drawing Sheets

FOREIGN PATENT DOCUMENTS

| | | |
|---|---|---|
| JP | 2000-354048 A | 12/2000 |
| JP | 2004-104804 A | 4/2004 |
| WO | 98/02008 A2 | 1/1998 |
| WO | 98/48528 A1 | 10/1998 |
| WO | 00/35230 A1 | 6/2000 |
| WO | 0054537 A2 | 9/2000 |

OTHER PUBLICATIONS

International Search Report w/translation from PCT/JP2007/074954 dated Mar. 25, 2008 (4 pages).

Written Opinion from PCT/JP2007/074954 dated Mar. 25, 2008 (4 pages).

3GPP TS 25.304 V6.9.0; "3rd Generation Partnership Project; Technical Specification Group Radio Access Network; User Equipment(UE) Procedures in Idle Mode and Procedures for Cell Reselection in Connected Mode"; Mar. 2006 (38 pages).

3GPP TS 36.300 V0.3.1; "3rd Generation Partnership Project; Technical Specification Group Radio Access Network; Evolved Universal Terrestrial Radio Access (E-UTRA) and Evolved Universal Terrestrial Radio Access Network (E-UTRAN)"; Nov. 2006 (64 pages).

Extended European Search Report for Application No. 07860183.8, mailed on Jul. 21, 2011 (6 pages).

Japanese Office Action for Application No. 2010-176178, mailed on Sep. 27, 2011 (6 pages).

Patent Abstracts of Japan for Japanese Publication No. 2004-104804, publication date Apr. 2, 2004 (1 page).

Philippines Office Action for Application No. 12009501326, mailed on Nov. 15, 2011 (1 page).

Korean Office Action for Application No. 10-2009-7013581, mailed on Oct. 27, 2011 (5 pages).

\* cited by examiner

USER EQUIPMENT AND METHOD USED IN MOBILE COMMUNICATION SYSTEM

TECHNICAL FIELD

The present invention generally relates to user equipment and a method used in a mobile communication system.

BACKGROUND ART

In a mobile communication network, after a phone call is finished, the user equipment (UE) releases the connection with the base station (and the upper node) and changes its mode from a connected mode (an active mode) to a waiting mode (an idle mode). In the waiting mode (the idle mode), the network does not manage nor register the cell where the user equipment is located but does manage and register the tracking area (TA) where the user equipment is located. The Tracking area (TA) may also be referred to as a location registration area, a routing area (RA), or the like, and, when a call is placed to the user equipment, paging is performed throughout the registered tracking area.

FIG. 1 schematically shows a case where a first tracking area TA1 includes three cells (cell 1, cell 2, and cell 3) and a second tracking area TA2 includes two cells (cell 4 and cell 5). Each of the base stations of the cells broadcasts the cell identification (cell ID) and the tracking area identification (TA-ID) via (using) the broadcast information (broadcast channel) (BCH). Next, a case is considered where the user equipment (UE) in the waiting mode (the idle mode) and in the cell 1 moves and accordingly performs a cell reselection by selecting the cell 3 as a waiting cell. In the process of the cell reselection, the user equipment (UE) receives the broadcast channel (BCH) from the base station of the cell 3 and checks the cell identification (cell ID) and the tracking area identification (TA-ID) included in the broadcast channel (BCH). As a result of the check, in the case of FIG. 1, the user equipment (UE) determines that both the cell 1 and the cell 3 belong to the same tracking area (TA1). Since there is no change of the tracking area, even when the user equipment (UE) performs the reselection of (reselects) the cell 3 and changes the cell to be selected from the cell 1 to the cell 3 in such a case like this, the user equipment does not issue a request to update the registration of the tracking area. Further, a case is considered where the user equipment (UE) further moves from the cell 3 into the cell 5 while keeping its waiting mode (the idle mode). In this case, the user equipment (UE) receives the broadcast channel (BCH) from the base station of the cell 5 and determines that the tracking area has changed from TA1 to TA2. In response to this change, the user equipment (UE) issues the request to update the registration of the tracking area to the base station of the cell 5, so that an update registration process of the tracking area (TA update) is performed. After this TA update, when a call is placed to the user equipment (UE), paging is performed for the user equipment (UE) throughout the tracking area TA2. As is described, the update registration of the tracking area is performed based on the request from user equipment (UE).

Recently, a mobile communication network called a private network (P-NW) as shown in FIG. 2 has been becoming more popular. For example, such a private network (P-NW) may include a mobile communication network to be used for only the staff members of a company organization within the facility of the company. The user equipment of the company staff members may communicate by using the private network within the facility of the company and by using a public network (i.e., a public mobile communication network other than any private network) outside the facility of the company. In this case, for users other than the staff members of the company, the communications provided by using the private network in the facility of the company is usually prohibited, or only limited services (such as an emergency call) can be provided by using the private network in the facility.

As another example of the private network, there is a base station apparatus (Home Node B) that can be installed in family homes. With the Home Node B, the right of using the Home Node B can be given to, for example, the family members only. However, the right of using the Home Node B may be temporarily given to a guest of the family members. In this case, the access (using) right is temporarily set in the user equipment of the guest so that the user equipment of the guest becomes a member of the private network.

A private network may also be referred to as "a CSG (Closed Subscriber Group) cell", and the private network may include one or more the CSG cells. The term "CSG" refers to a group of the user equipment sets having an access (using) right to a specific private network, and the term "CSG cell" refers to a cell where each member of the CSG has a right to access.

As a method of limiting users so that only the limited users can use the private network, there is a known method of using a forbidden TA (Tracking Area) list. The forbidden TA List includes the tracking area identification of the private networks (TA-ID-PR). The forbidden TA list is individually transmitted to user equipment when the user equipment updates the registered TA (performs the TA update). The user equipment stores the forbidden TA list in its memory. When user equipment in the waiting mode (the idle mode) reselects the cell of the private network, the user equipment determines whether the tracking area identification (TA-ID-PR) of the private network is included in the forbidden TA list stored in the memory. As a result of the determination, if the tracking area of the cell reselected by the user equipment is included in the forbidden TA list, a process of waiting for a call performed by the user equipment in the cell is forbidden, thereby causing the user equipment to reselect another cell. The technique using the forbidden TA list as described above is described in, for example, Non Patent Document 1.

Non Patent Document 1: 3GPP, TS25.304, ver6.9.0

DISCLOSURE OF INVENTION

Problems to be Solved by the Invention

In the above method, however, as the number of the private networks increases, the amount of information (signaling overhead) required to transmit the information of the private networks increases accordingly. In addition, it may become difficult (cumbersome) to determine whether the TA-ID of the cell that provides a particular service to the user equipment (serving cell) is included in a large number of TA-IDs of the private networks (forbidden TA list). Further, since more and more private networks have been introduced in various areas including in family homes in addition to specific company organizations, it may become more and more difficult to transmit the forbidden TA list and determine whether the TD-ID is included in the forbidden TA list and the like. Further, it becomes necessary for the network to manage and store each forbidden TA list of the user equipment, and as a result, the operational burden of the network may be remarkably increased. For example, when one Home Node B is installed in a family home, it becomes necessary to update each forbidden TA list of the large number of user equipment sets, which alone makes the management of the forbidden TA lists cumbersome and complicated.

An object of the present invention is to provide a private network control method capable of eliminating the need for performing cumbersome management and notification of the forbidden TA lists and, when user equipment reselects the cell of a private network, easily determining whether the user equipment has a right to access the private network.

Means for Solving the Problems

According to an aspect of the present invention, user equipment to be used in a mobile communication system is used. The user equipment includes a specifying unit specifying a tracking area of a serving cell based on broadcast information, a determination unit, when the specified tracking area is for a private network, determining whether the user equipment is entitled to communicate in the private network; and a transmission unit, when the user equipment is entitled to communicate in the private network, transmitting a signal to a base station of the serving cell, the signal requesting that a tracking area be updated to a tracking area for the private network. Further, in the user equipment, the determination unit determines whether the specified tracking area is for the private network by checking a common identification which is common to private networks, and the determination unit determines whether the user equipment is entitled to communicate in the private network by checking whether the private network to which the serving cell belongs is the same as or different from a private network in which the user equipment is entitled to communicate.

Advantageous Effect of the Invention

According to an embodiment of the present invention, there is provided a private network control method capable of eliminating the need for performing cumbersome management and notification of the forbidden TA lists and, when user equipment reselects the cell of a private network, easily determining whether the user equipment has a right to access the private network.

EXPLANATION OF REFERENCES

Figure 1:
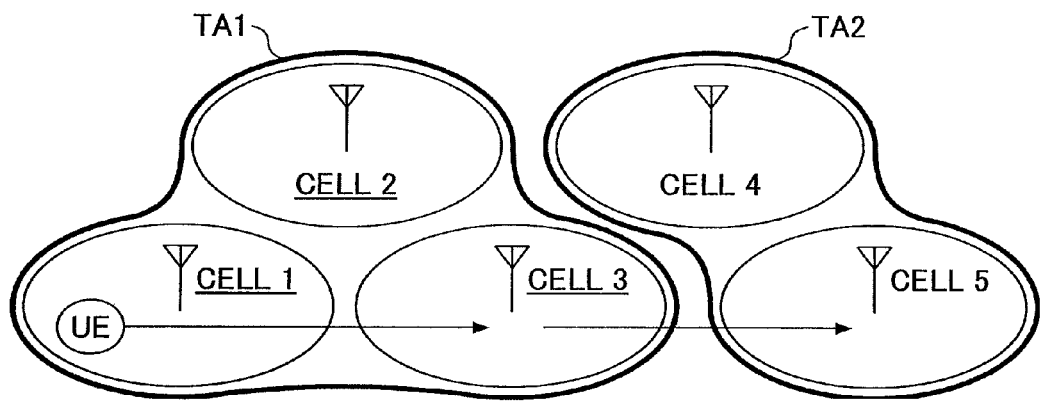
FIG. 1 is a drawing schematically showing a mobile communication system.
Figure 2:
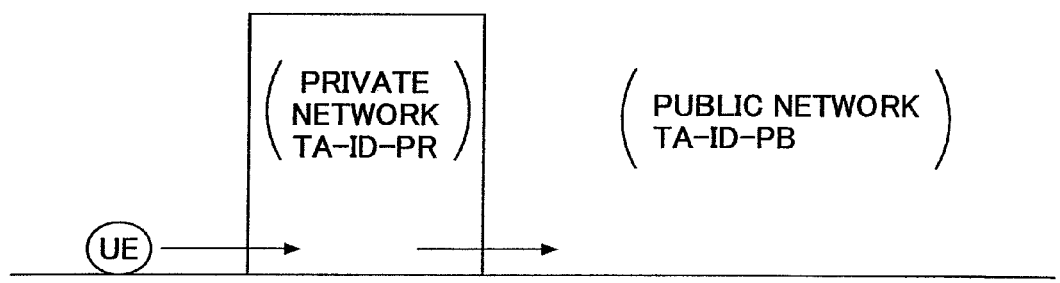
FIG. 2 is a drawing showing a private network and a public network.

31: RADIO (RF) RECEIVE SECTION
32: CELL SEARCH SECTION
33: BCH INFORMATION ACQUISITION SECTION
34: CONTROL SECTION
35: SIR MEASUREMENT SECTION
36: CELL SELECTION SECTION

BEST MODE FOR CARRYING OUT THE INVENTION

According to an embodiment of the present invention, by checking a common identification which is common among the private networks, it may become possible to determine whether the tracking area of a cell that provides a particular service to the user equipment (hereinafter referred to as a "serving cell") belongs to a private network. Namely, by determining whether the network to which the serving cell belongs is the same as or different from a private network in which the user equipment is entitled to communicate, it may become possible to determine whether the user equipment is allowed to wait for a call in the serving cell.

According to an embodiment of the present invention, whether the user equipment is in a private network is determined by checking the common identification. Therefore, it is not necessary for the network to give notification of a large amount of forbidden TA list information to the user equipment as performed in a conventional system (method) and as a result, the user equipment does not have to check the TA-IDs included in the forbidden TA list one by one any longer.

The common identification may be expressed by any number (value) within a predetermined range of numbers and included in the broadcast channel (BCH) as an indicator indicating any number (value) within the predetermined range of numbers. By doing this, the present invention may be embodied by, for example, using an additive data field of one bit in the broadcast channel (BCH).

Further, whether the user equipment is allowed to wait for a call in the serving cell may be determined based on whether the cell identification (cell ID) of the serving cell belonging to a private network is the same as or different from the cell identification (cell ID) of the private network in which the user equipment is entitled to communicate.

Otherwise, whether the user equipment is allowed to wait for a call in the serving cell may be determined based on whether the tracking area identification (TA-ID) of the serving cell belonging to a private network is the same as or different from the tracking area identification (TA-ID) of the private network in which the user equipment is entitled to communicate.

According to an embodiment of the present invention, the common identification may be expressed by a value indicating a boundary of a value range (numeral range).

As described above, whether the user equipment is allowed to wait for a call in the serving cell may be determined based on whether the cell identification (cell ID) of the serving cell belonging to a private network is the same as or different from the cell identification (cell ID) of the private network in which the user equipment is entitled to communicate. From a point of view that the cell identification (cell ID) is reported from the cell regardless of whether the present invention is carried out, this method may be advantageous in that currently provided (available) data can be used to determine whether the user equipment is allowed to wait for a call in the serving cell.

According to an embodiment of the present invention, the common identification may be expressed (provided) by using the tracking area identification commonly secured (shared) by the private networks.

In the following, plural embodiments are described separately for the explanation purposes. However, such separation of the embodiments is not essential to the present invention, and two or more embodiments may be used on an as needed basis.

In the following, embodiments of the present invention are described with reference to the accompanying drawings. In the figures, basically, the same reference numerals (and/or reference symbols) are commonly used to describe the same or equivalent elements.

First Embodiment

Figure 3:
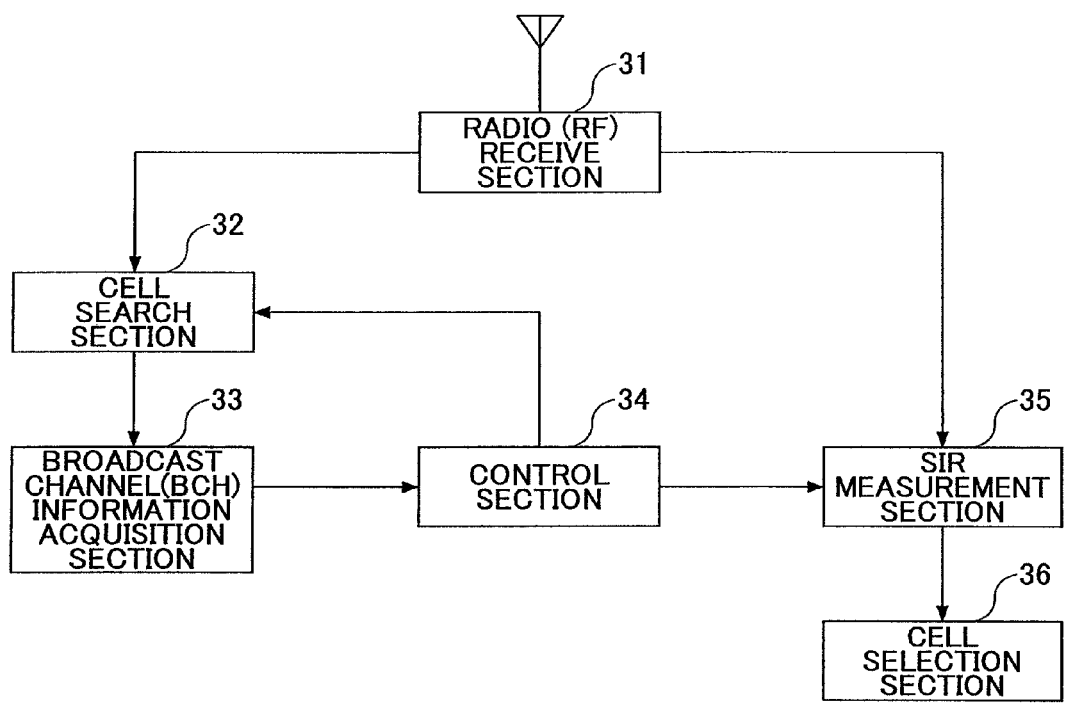
FIG. 3 is a drawing showing an exemplary configuration of user equipment according an embodiment of the present invention.

FIG. 3 shows an exemplary configuration of user equipment according to an embodiment of the present invention. As shown in FIG. 3, the user equipment includes a radio (RF) receive section 31, a cell search section 32, a broadcast channel (BCH) information acquisition section 33, a control section 34, an SIR measurement section 35, and a cell selection section 36.

The radio (RF) receive section 31 converts a received radio signal into a baseband digital signal.

The cell search section 32 detects a cell capable of providing a higher receiving power (receiving quality) based on a reference signal included in the received signal. In other words, the cell search section 32 detects a cell having the least path loss among candidate cells. The reference signal refers to any signal known to both the transmitter side and the receiver side, and may be referred to as a known signal, a pilot signal, a training signal and the like.

The broadcast channel (BCH) information acquisition section 33 acquires and extracts the broadcast channel (BCH) information transmitted from the cell selected (specified) by the cell search section 32. For example, the broadcast channel (BCH) includes a Master Information Block (MIB) or one or more System Information Blocks (SIBs). The MIB may be transmitted at a predetermined frequency (e.g., once every 10 ms) using a predetermined resource block. For example, in an OFDM (Orthogonal Frequency Division Multiplexing) system such as an LTE (Long Term Evolution) system in which scheduling for allocating resource blocks is performed, the MIB may be transmitted by using six resource blocks (e.g., 1.25 MHz) in the middle of the system bandwidth. The MIB may include the information items indicating the system bandwidth (e.g., 5 MHz, 10 MHz, 20 MHz and the like) and the location (time and/or frequency) where the SIB is allocated. According to this embodiment of the present invention, the MIB includes an indicator indicating a value of "1" or "0". In this case, for example, the value "1" denotes that the cell belongs to a private network, and the value "0" denotes that the cell does not belong to any private network. However, the number of values expressed by the indicator is not limited to two (2) values. Namely, the indicator may have three (3) or more values. The transmission timing of the MIB is determined constant. On the other hand, the transmission timings and the frequency of the SIB may not be constant, because the SIB is transmitted by using resource blocks which area determined by the scheduling. For example, the SIB may include identification items such as the tracking area identification (TA-ID), an operator identification (PLMN-ID), an identification item indicating that the cell is under control, and an identification item indicating that the cell is reserved for a specific terminal such as a terminal for maintenance. In the present invention, it is not essential that any of the indicators (the indicator may be referred to as a CSG indicator, a P-NW indicator, and the like) is included in the MIB, and such an indicator may be included in the SIB. Further, whether the cell belongs to a private network may be determined by using another method (described below) not by using such an indicator.

The control section 34 controls the functional elements related to the present invention. How the control is performed is shown as the operations in FIG. 4.

The SIR measurement section 35 measures the receiving quality of the reference signal from the serving cell. In this embodiment of the present invention, the receiving quality is measured (evaluated) based on measured SIR. However, the receiving quality may be expressed by using any other appropriate amount known in this technical field, the types of the amount including the RSRP (Reference Signal Received Power), the Ec/No (Energy per Chip-to-Noise power spectral density), and the SINR (Signal-to-Interference and Noise power Ratio).

The cell selection section 36, when the receiving quality is equal to or greater than a predetermined threshold value, performs a cell reselection, and sends a request to the base station to update the (registered) tracking area on an as needed basis.

Figure 4:
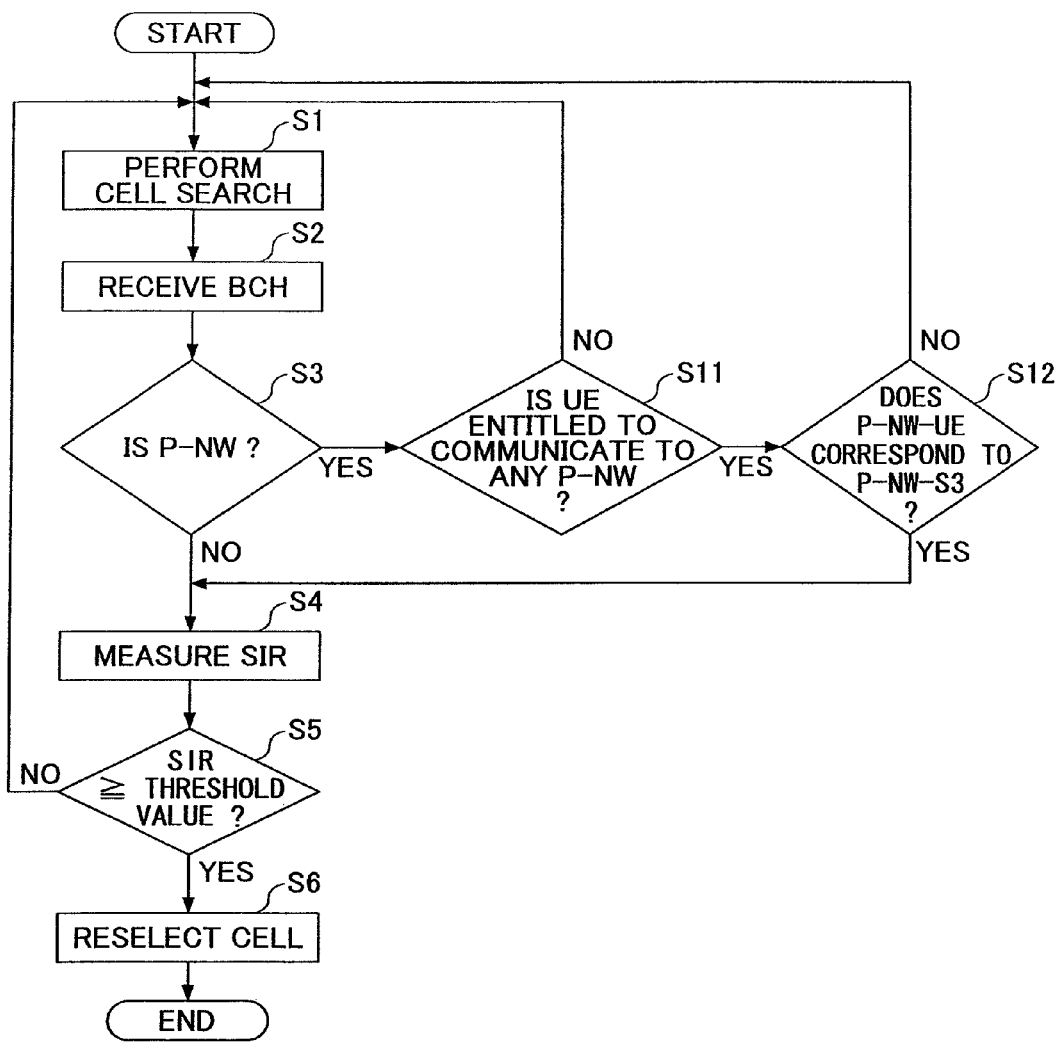
FIG. 4 is a flowchart showing an exemplary method according to an embodiment of the present invention.

FIG. 4 is a flowchart showing a method according to an embodiment of the present invention. The procedure shown in FIG. 4 is performed by the user equipment. For the convenience of the explanation, it is assumed that the user equipment is kept in the waiting mode (the idle mode) after a call is terminated, and moves across the cells while remaining in the waiting mode (the idle mode).

In step S1, the user equipment performs a cell search.

In step S2, the user equipment acquires the broadcast channel (BCH) from the cell specified in the cell search in step S1.

In step S3, the user equipment determines whether the serving cell belongs to a private network based on the private network indicator (P-NW indicator) included in broadcast channel (BCH). In this case, the P-NW indicator indicates a value "1" or "0". In this case, for example, the value "1" denotes that the cell belongs to a private network, and the value "0" denotes that the cell does not belong to any private network. The number of values that the P-NW indicator may have is not limited to two (2) values. Namely, the P-NW indicator may have three (3) or more values. For example, the P-NW indicator may have one of three (3) values, in which the value "0" denotes that the cell belongs to a public network, the value "1" denotes that the cell belongs to a private network, and the value "2" denotes that the cell belongs to another private network. In the following description, for the simplicity of the description, it is assumed that the P-NW indicator may have one value "1" or "0".

In step S4, when the user equipment is allowed to wait in and communicate in the network to which the serving cell belongs, the user equipment measures the receiving quality of the reference signal from the cell. The receiving quality may be measured by evaluating the SIR or the like.

In step S5, the user equipment determines whether the measured receiving quality is equal to or greater than a predetermined threshold value. When determining that the measured receiving quality is not equal to or greater than a predetermined threshold value, the cell to which the user equipment belongs is unchanged as it is and the process goes back to step S1. On the other hand, when determining that the measured receiving quality is equal to or greater than a predetermined threshold value, the process goes to step S6.

In step S6, the cell reselection is performed so that the cell to which the user equipment belongs becomes the serving cell. After the reselection, the request to the base station to update the (registered) tracking area is issued on an as needed basis.

In step S3, when determining that the serving cell belongs to the private network, the process goes to step S11.

In step S11, the user equipment determines whether the user equipment is entitled to communicate in any of the private networks. When determining that the user equipment is not entitled to communicate in any of the private networks, the process goes back to step S1. Otherwise, the process goes to step S12.

In step S12, the user equipment determines whether the private network specified in step S3 (hereinafter may be simplified as "P-NW-S3") is included in the private networks in which the user equipment is entitled to communicate (hereinafter may be simplified as "P-NW-UE"). When determining that the P-NW-S3 is not included in the P-NW-UE, the process goes back to step S1. On the other hand, when determining that the P-NW-S3 is included in the P-NW-UE, the process goes to step S4. In this case, the user equipment is entitled to wait and communicate in the serving cell.

Whether the serving cell belongs to the P-NW-UE may be determined by using, for example, the cell identification (cell ID). For example, a case is considered where user equipment of a company staff member is entitled to use the private network of the company where the private network includes a cell #131, a cell #132, and a cell #133, and those three cells are specified by (belong to) a tracking area #300. In this case, the user stores the cell identifications (cell IDs) indicating the cell #131, the cell #132, and the cell #133 in the memory of the user equipment. Then, in such a case as shown in step S12, by comparing the cell identification (cell ID) of the serving cell with the cell identifications (cell IDs) stored in the memory of the user equipment, it may become possible to determine whether the user equipment of the company staff member is entitled to communicate in the private network.

Otherwise, the tracking area identification (TA-ID) indicating the tracking area #300 may be stored in the memory of the user equipment. In this case, in such a case as shown in step S12, by comparing the tracking area identification (TA-ID) of the serving cell with the tracking area identification (TA-ID) stored in the memory of the user equipment, it may become possible to determine whether the user equipment is entitled to communicate in the private network.

As described above, according to the embodiment of the present invention, by arranging so that the broadcast channel (BCH) to be broadcasted from each cell includes the private network indicator (P-NW indicator) indicating whether the cell belongs to a private network, it may become possible to eliminate the need for the notification of the forbidden TA lists from the surrounding cells as conventionally performed. Further, since the P-NW indicator may be expressed by using one value of a limited number of values (typically two values), it may become possible to extremely easily determine whether the serving cell belongs to a private network. The determination of whether the user equipment is related to the private network, namely, whether the user equipment is entitled to communicate in the private network, may be extremely easily performed by comparing the cell identification (cell ID) (or the tracking area identification (TA-ID)) of the cell with the cell identifications (cell IDs) (or the tracking area identification (TA-ID)) in which the user equipment is entitled to communicate. By using the method, it may become possible to eliminate the need for the enormous calculation burden of comparing one by one the tracking area identification (TA-ID) of the serving cell with each of the numerous tracking area identifications (TA-IDs) in which the user equipment is forbidden to communicate (access). Further, it may become unnecessary for the network or the like to manage (register) the enormous forbidden TA lists and notify the forbidden TA lists from the network, which are necessary to be performed in a conventional method.

Second Embodiment

In the first embodiment of the present invention, additive information such as the private network indicator (P-NW indicator) is required to be included in the broadcast channel (BCH). On the other hand, in a second embodiment of the present invention, the cell identifications (cell IDs) identifying the cells of the private networks are defined and included within a predetermined numeral range, and an information item specifying the predetermined numeral range or the like is provided in the broadcast channel (BCH). For example, a case is described where the numbers in a range from 00001 to 30000 are assigned to the cell identifications (cell IDs); among them the numbers in a range from 00001 to 20000 are assigned to the cells belonging to a public network and the numbers in a range from 20001 to 30000 are assigned to the cells belonging to a private network.

In this case, in step S2 of FIG. 4, the user equipment acquires the boundary value N=20000 of the numeral range, the cell identifications (cell IDs) of the cell and the like from the broadcast channel (BCH). Then, in step S3, the user equipment can determine that if the cell has a cell ID greater than the 20000, the cell belongs to a private network and that if cell has a cell ID equal to or less than 2000, the cell belongs to a public network. In this case, the boundary value N may be a variable or constant. When the boundary value N is variable, the boundary value N may be separately reported from a network, for example, upon the user equipment being turned ON and attached (send a registration request) to the network or upon the update registration process of the tracking area (TA update) being performed. Further, the value of the boundary value N may be broadcasted from each cell.

In step S12, the determination of whether the serving cell belongs to the P-NW-UE may be performed by checking whether the cell identification (cell ID) of the serving cell is included in the cell identifications (cell IDs) of the P-NW-UE. By comparing the cell identification (cell ID) of the serving cell and the cell identifications (cell IDs) already stored in the memory of the user equipment, it may become possible to determine whether the user equipment is entitled to communicate in the private network.

Otherwise, the user equipment may store the tracking area identification (TA-ID) of the private networks in which the user equipment is entitled to communicate. In this case, and in such a case as shown in step S12, by comparing the tracking area identification (TA-ID) of the serving cell and the tracking area identification (TA-ID) already stored in the memory of the user equipment, it may become possible to determine whether the user equipment is entitled to communicate via the private network.

The cell identification (cell ID) may be reported in the form of a bit string indicating the cell identification (cell ID) as the broadcast information of the broadcast channel (BCH) or superimposed on the other downlink signal.

Third Embodiment

In the first embodiment of the present invention, additive information such as the private network indicator (P-NW indicator) is required to be included in the broadcast channel (BCH). On the other hand, in a third embodiment of the present invention, a single tracking area identification commonly used (shared) among many private networks (common TA-ID) is used instead of using the P-NW indicator. For example, a case is described where the TA-ID "1000" is assigned and set as the common TA-ID. In this case, all the cells belonging to any of the private networks reports "1000" as the TA-ID of the tracking area to which the cell belongs. The user equipment already knows that the tracking area having the TA-ID of 1000 belongs to a private network and has such information in the memory of the user equipment.

Therefore, in such a case as shown in step S3, the user equipment may determine whether the cell belongs to a private network by checking whether the TA-ID broadcasted from the cell is 1000.

In step S12, the determination of whether the serving cell belongs to the P-NW-UE may be performed by checking whether the cell identification (cell ID) of the serving cell is included the cell identifications (cell IDs) of the P-NW-UE. By comparing the cell identification (cell ID) of the serving cell and the cell identifications (cell IDs) already stored in the memory of the user equipment, it may become possible to determine whether the user equipment is entitled to communicate in the private network.

Otherwise, the user equipment may store the tracking area identifications (TA-IDs) of the private networks to which the user equipment is entitled to communicate (in this case, however, the tracking area identifications (TA-IDs) should be values other than 1000 and different from each other). In this case, each cell broadcasts not only the common TA-ID but also the TA-IDs uniquely assigned to each private network and different from each other with respect to each private network (individual TA-IDs) as the broadcast channel (BCH) information. In such a case as shown in step S12, by comparing the individual TA-ID of the serving cell and the each of the individual TA-IDs already stored in the memory of the user equipment, it may become possible to determine whether the user equipment is entitled to communicate via the private network.

Forth Embodiment

Figure 5:
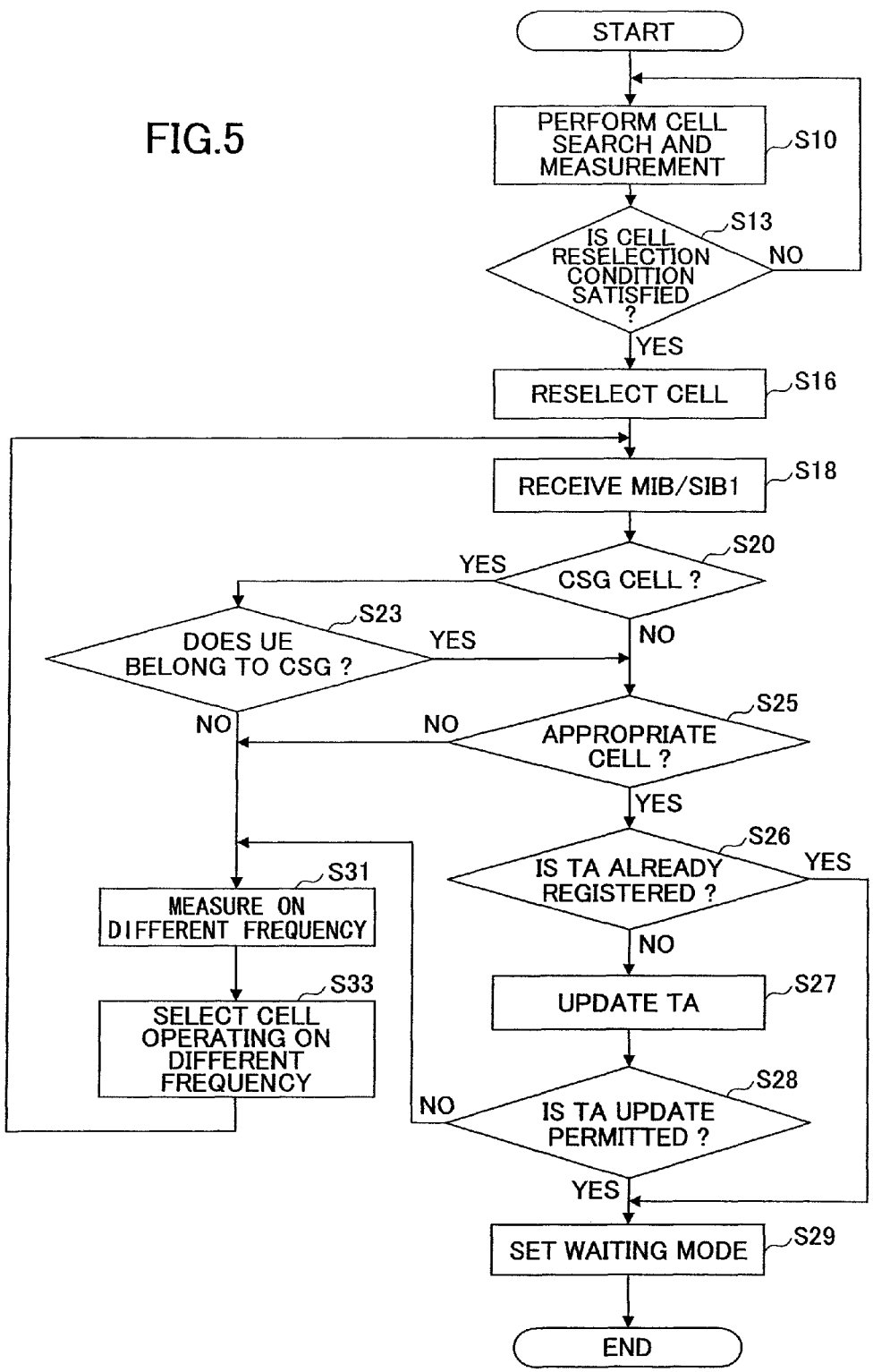
FIG. 5 is a flowchart showing another exemplary method according to an embodiment of the present invention.

FIG. 5 is a flowchart showing another method according to a fourth embodiment of the present invention. This method is performed by user equipment. In the above embodiments, the determination related to the private network is performed before the cell reselection is performed. In this embodiment, however, the step of the determination is performed after the step of performing the cell reselection. As described above, the term "CSG cell" has the same meaning of the term "private network". For the convenience of the explanation, it is assumed that the user equipment moves while keeping itself in the waiting (idle) mode.

In step S10, the user equipment performs the cell search and a measurement of the receiving quality (such as the SINR) of the signals from the surrounding cells contiguous to the serving cell.

In step S13, the user equipment determines whether the cell reselection is to be performed. This determination may be performed based on the comparison between the receiving quality of the signals from the serving cell and the receiving quality of the signal from the surrounding cells coupled with offset and hysteresis. For example, when the following formula is satisfied, it may be possible to determine that the cell reselection condition is satisfied.

> (receiving quality of the signal from the serving cell)<
> (receiving quality of the signal from the surrounding cell)+(offset)

In this formula, the (offset) is given as a combination of (hysteresis) and (offset dedicated to the cell). The (hysteresis) refers to a quantity to reduce the variation near the cell edge. The (offset dedicated to the cell) refers to a quantity arbitrarily set for each cell. By appropriately adjusting the quantity, it may become possible to arrange the cell so that the cell becomes more likely or unlikely to be selected.

In step S16, with respect to the cell satisfying the cell reselection condition, the user equipment performs the cell reselection (or the base station allows the user terminal to perform the cell reselection (handover) in response to a request from the user equipment).

In step S18, the user equipment receives the broadcast channel (BCH) from the reselected cell. The broadcast channel (BCH) may include various information blocks. In this embodiment, however, attention is particularly focused on the MIB and the SIB1. As described above, the MIB may include the information items indicating the system bandwidth and the location (time and/or frequency) where the SIB1 is allocated. The SIB may includes identification items such as the tracking area identification (TA-ID), the operator identification (PLMN-ID), an identification item indicating that the cell is under control, and an identification item indicating that the cell is reserved for a specific terminal such as a terminal for maintenance. In addition to that, in this embodiment, each of the MIB and the SIB1 includes an indicator indicating whether the cell belongs to the CSG cell (CSG cell indicator).

In step S20, the user equipment determines whether the reselected cell belongs to the CSG cell by checking the CSG cell indicator. When determining that the reselected cell belongs to the CSG cell, the process goes to step S23.

In step S23, the user equipment determines whether the user equipment belongs to the CSG to which the CSG cell belongs. This determination may be performed by comparing the tracking area identification (TA-ID) related to the CSG cell to which the user equipment is entitled to communicate with the tracking area identification (TA-ID) read from the broadcast channel (BCH). This method largely differs from a conventional method in that, in the conventional method, it is required to check if the tracking area identification (TA-ID) read from the broadcast channel (BCH) corresponds to each of an enormous number of the TA-IDs included in the forbidden TA list one by one. When determining that the user equipment belongs to the CSG to which the CSG cell belongs, the process goes to step S25.

In step S25, the user equipment determines whether the reselected cell is an appropriate cell where the user equipment may be kept in the waiting mode (the idle mode) (hereinafter may be simplified as an appropriate cell) (qualification check). When the process proceeds from step S23 to step 25, the reselected cell is the CSG cell. On the other hand, when he process proceeds from step 20 to step 25, the cell is a cell other then the CSG cell (the cell other then the CSG cell may be referred to as a public cell, a macro cell and the like). The qualification check may be performed by, for example, checking the forbidden TA list or the PLMN-ID or confirming that the cell is not under control, or that the user equipment has an access right. When determining that the reselected cell is the appropriate cell so that the user equipment may be kept in the waiting mode (the idle mode), the process goes to step S26.

In step S26, the user equipment determines whether the tracking area identification (TA-ID) of the reselected cell has been already registered as the (registered) tracking area of the user equipment. When determining that the tracking area identification (TA-ID) of the reselected cell has not been registered as the tracking area of the user equipment, the process goes to step S27.

In step S27, the user equipment sends a request to an upper node (such as an MME (Mobility Management Entity)) of the base station to update the registration of the tracking area (this process may be referred to as TAU (Tracking Area Update)). In response to the request, the upper node gives notification to the user equipment whether the update of the tracking area is permitted.

In step S28, the user equipment determines whether the update of the tracking area is permitted. When determining that the update of the tracking area is permitted, the process goes to step S29.

In step S29, the user equipment performs the waiting operation (waiting mode (the idle mode)) in the reselected cell and the process ends.

On the other hand, in step S25, when determining that the reselected cell is not the appropriate cell where the user equipment may be kept in the waiting mode (the idle mode), or, in step S28, when determining that the update of the tracking area is not permitted, the process goes to step S31.

In step S31, the user equipment changes its operations mode to a different frequency measurement mode. During the different frequency measurement mode, it is forbidden to go back to a frequency of the previous service cell of the user equipment (frequency barring).

In step S33, the user equipment performs a cell search on a different frequency. When there exists a cell operating on the different frequency, the cell operating on the different frequency is selected as the (new) serving cell of the user equipment (cell selection). Then, the process goes back to step S18, and the same operations from the step S18 are performed with respect to the cell operating on the different frequency.

As described above, in any of the cases: where the user equipment is not entitled to communicate in (has no right to access) the reselected CSG cell (NO in step S23); where the reselected cell is not the appropriate cell (NO in step S25); and where the update of the tracking area is not permitted (NO in step S28), the cell search on a different frequency is forcibly performed.

Figure 6:
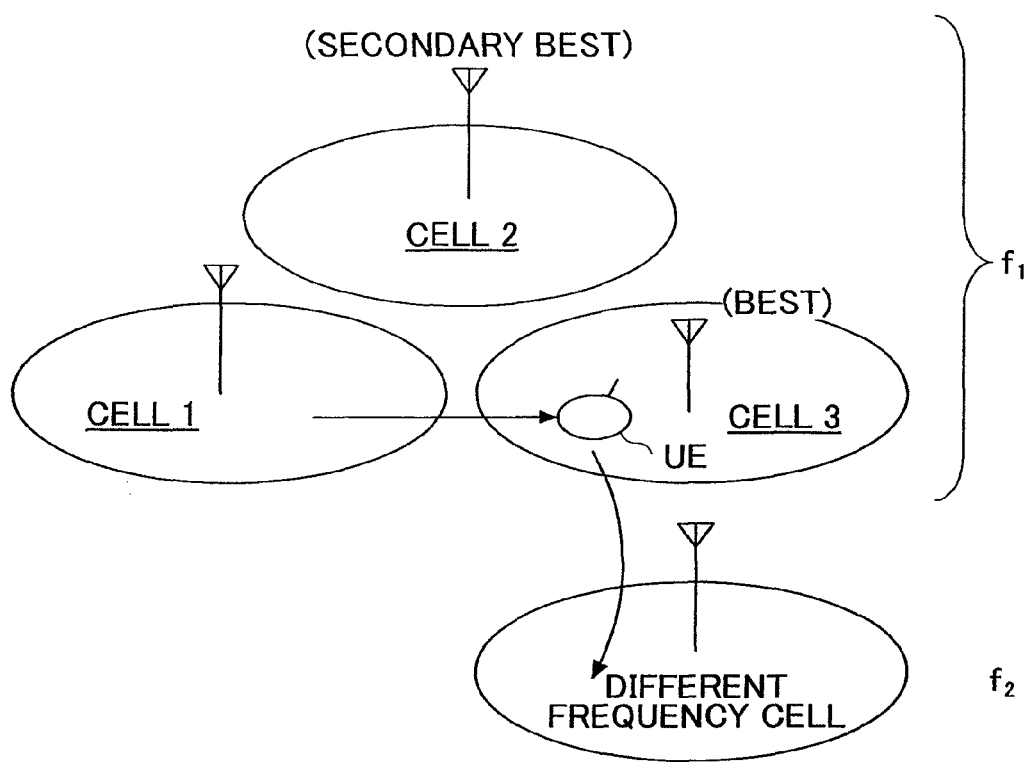
FIG. 6 is a drawing showing a case where two systems using different frequencies exist side by side.

FIG. 6 schematically shows a case where two systems side by side are operating on different frequencies $f_1$ and $f_2$ from each other. As shown in FIG. 6, when the user equipment moves into the cell 3 reselected (detected) in step S16 but NO is determined in any of step S23, S25, and S28, the user equipment cannot operate in the waiting mode (the idle mode) in the cell 3. In this case as shown in FIG. 6, the receiving quality is not good of the signal from the cell 1 which the user equipment selected before the reselection of the cell 2. Therefore, if the user equipment intends to continue to select the cell 1 as the serving cell, it may become difficult for the user equipment to appropriately continue its waiting mode (the idle mode). To overcome the situation, in the method according to the embodiment of the present invention, in such a case, the process goes into the different frequency measurement mode (steps S31 and S33) in which the cell search on a different frequency is forcibly performed. By doing this, the user equipment may find the appropriate cell such as the cell on the different frequency as shown in FIG. 6. However, when no such a cell on the different frequency is to be found, the user equipment may be regarded as being (located) in a no service area.

In step S26, when determining that the tracking area identification (TA-ID) of the reselected cell is already registered as the tracking area of the user equipment, the process goes to step S29. This operation going to step S29 obviously occurs when, for example, the user equipment moves from cell 1 to cell 3 in FIG. 1. However, besides this case, the operation going to step S29 may occur in other cases such as when not only TA1 but also TA2 are already registered as the tracking areas for the user equipment and the user equipment moves from cell 3 to cell 5. In this case, the tracking area identification (TA-ID) to which the serving cell belongs is changed (from TA1 to TA2), however both TA1 and TA2 are already registered. In such a case, it is not necessary to change the tracking area for the user equipment.

Fifth Embodiment

Figure 7:
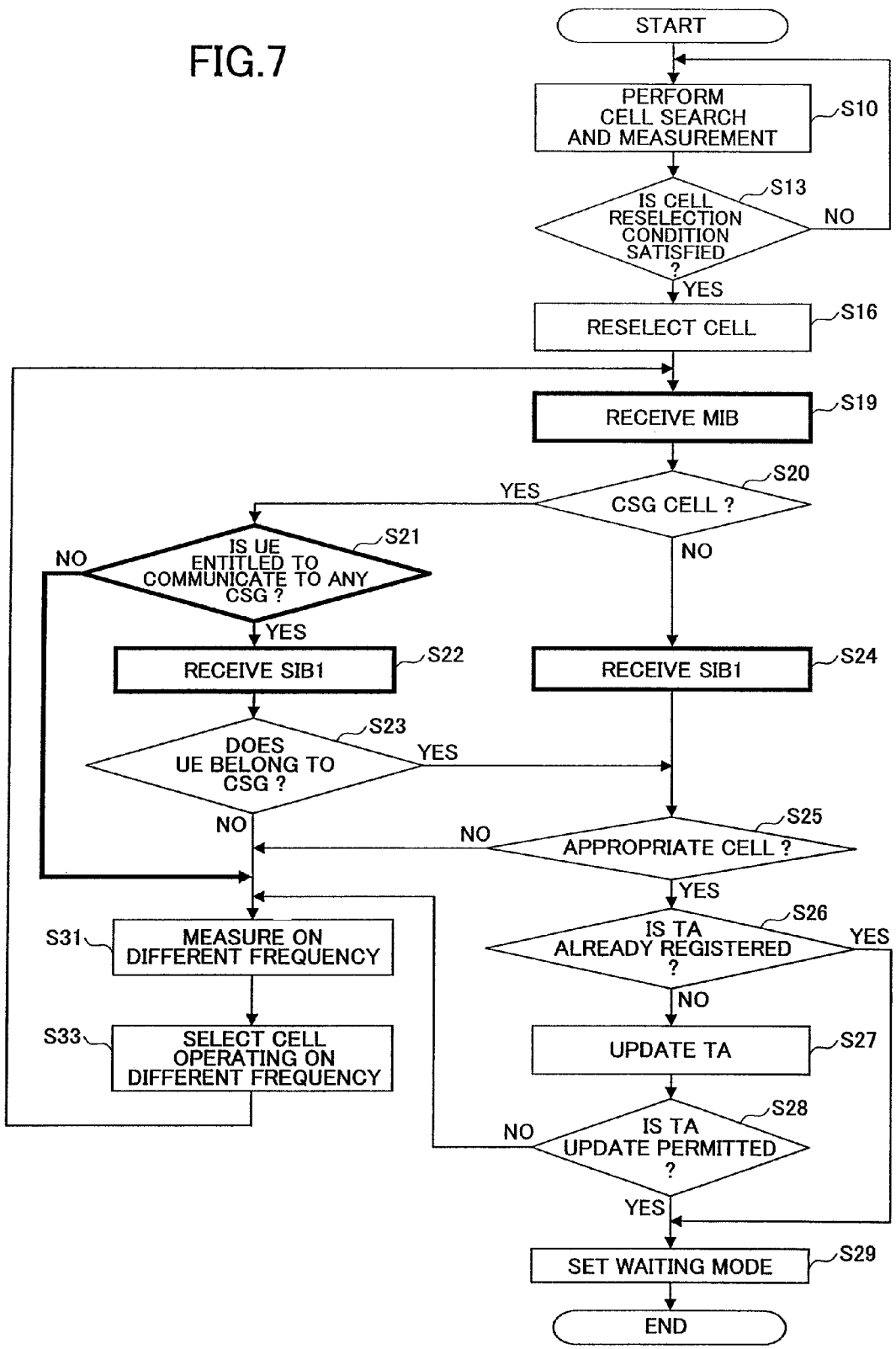
FIG. 7 is a flowchart showing another exemplary method according to an embodiment of the present invention.

FIG. 7 is a flowchart showing another method according to a fifth embodiment of the present invention. In the fourth embodiment of the present invention, the CSG cell indicator may be included anywhere in the broadcast channel (BCH). In this fifth embodiment of the present invention, however, the CSG cell indicator is included in the MIB of the broadcast channel (BCH). In FIG. 7, the same reference numerals and the same reference symbols are used to describe the same steps as earlier described with reference to FIG. 5, and those descriptions are omitted.

In step S19, after performing the cell reselection, the user equipment receives the MIB in the broadcast channel (BCH). For example, the MIB is transmitted from the base station using a bandwidth corresponding to six (6) resource blocks in the middle of the system bandwidth once every 10 ms. In this embodiment of the present invention, the MIB includes not only the information items indicating the system bandwidth and the location (time and/or frequency) where the SIB is allocated but also the CSG indictor indicating a value of "0" or "1". For example, the value "0" denotes that the cell is the CSG cell, and the value "1" denotes that the cell is not the CSG cell (non CSG cell).

In step S20, the user equipment determines whether the reselected cell is the CSG cell by checking the value of the CSG cell indicator. When determining that the reselected cell is not the CSG cell, the cell is determined as a public cell which any user equipment may access. In this case, the process goes to step S24.

In step S24, the user equipment receives the SIB1 in the broadcast channel (BCH). The frequency (resource block) and the time (sub-frame) allocated to the SIB1 can be acquired by checking the MIB. The SIB1 includes a larger amount of information than the MIB but is less frequently transmitted than the MIB. For example, the SIB1 may include identification items such as the tracking area identification (TA-ID), the operator identification (PLMN-ID), the identification item indicating that the cell is under control, and the identification item indicating that the cell is reserved for a specific terminal such as a terminal for maintenance.

In step S25, the user equipment determines whether the reselected cell is the appropriate cell so that the user equipment may be kept in the waiting mode (the idle mode) (qualification check). When the process proceeds from step S23 to step 25, the reselected cell is the CSG cell. On the other hand, when he process proceeds from step 20 to step 25, the cell is a cell other then the CSG cell (the cell other then the CSG cell may be referred to as a public cell, a macro cell and the like). The qualification check may be performed by, for example, checking the forbidden TA list or the PLMN-ID or confirming that the cell is not under control or that the user equipment has an access right. When determining that the reselected cell is the appropriate cell so that the user may be kept in the waiting mode (the idle mode), the process goes to step S26, so that the earlier described processes are performed.

When the process goes to step S21, the reselected cell is determined as the CSG cell. Then, in step in S21, the user equipment determines whether the user equipment is entitled to communicate in any of the CSG cells. When determining that the user equipment is entitled to communicate in any of the CSG cells, the user equipment receives the SIB1 in the broadcast channel (BCH) same as in step S24.

In step S23, a comparison is performed between the tracking area identification (TA-ID) of the CSG cell in which the user cell is entitled to communicate and the tracking area identification (TA-ID) of the reselected cell checked in the SIB1. By doing this, the user equipment determines whether the reselected cell which is the CSG cell is the appropriate cell so that the user may be kept in the waiting mode (the idle mode) (whether the user equipment has the access right to the CSG cell). When determining that the user equipment has the access right to the CSG cell, the process goes to step S25 and otherwise, the process goes to step S31, so that the earlier described processes are performed.

On the other hand, in step S21, when determining that the user equipment does not have any right to access any of the CSG cells, the user equipment cannot connect (communicate) in the reselected cell that is the CSG cell. Therefore, in this case, it is not necessary for the user equipment to acquire broadcast information from the broadcast channel (BCH) such as SIB1 from the reselected cell. On the other hand, if the user equipment intends to connect to the cell that had been connected before the cell reselection, the receiving quality of the signal from the cell 1 may become worse and a high interference level may affect the CSG cell. To avoid the situation, in the method according to the embodiment of the present invention, when determining that the user equipment does not have any right to access any of the CSG cells, the process skips step S22 and promptly goes to steps S31 and S33 to perform the different frequency measurement, so that the earlier described processes are performed. In this method, since it is not necessary for the user equipment to receive the SIB1 having a larger amount of information than the MIB and transmitted less frequently than the MIB, it may become possible for such user equipment to search for the appropriate cell for the user equipment quickly.

Sixth Embodiment

Figure 8:
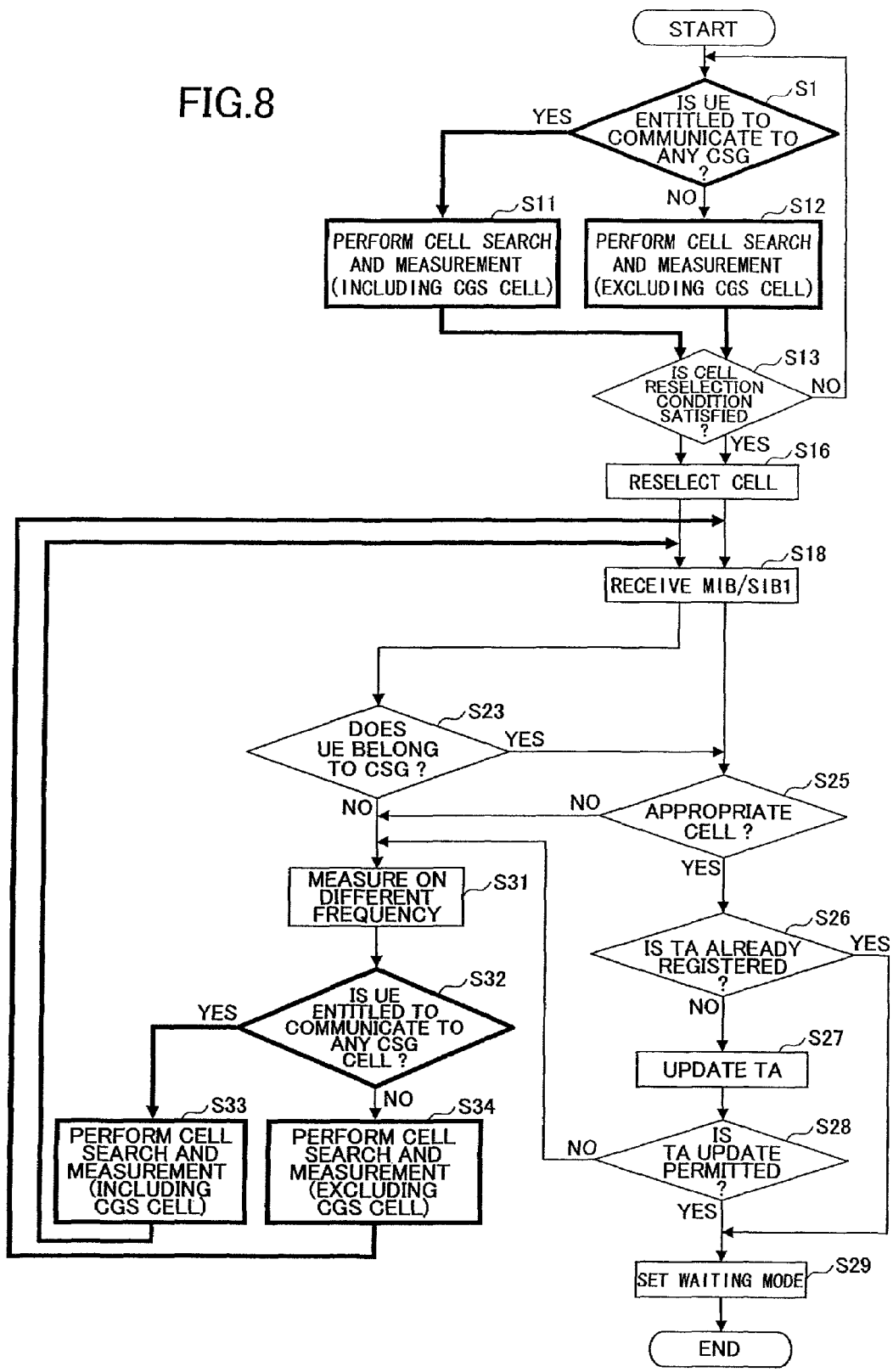
FIG. 8 is a flowchart showing another exemplary method according to an embodiment of the present invention.

FIG. 8 is a flowchart showing another method according to a sixth embodiment of the present invention. In FIG. 8, the same reference numerals and the same reference symbols are used to describe the same steps as earlier described with reference to FIG. 5, and the descriptions thereof are omitted. In the above fourth and fifth embodiments, it is determined that the cell is the CSG cell by using the CSG cell indicator specially provided in the broadcast channel (BCH) information. On the other hand, in this embodiment, whether the cell is the CSG cell is determined by checking if a cell ID of the physical layer (e.g., a scramble code) corresponds to a specific cell ID. For example, as described in the second embodiment above, numbers in a range from 1 to 504 are used for the cell IDs; among them, the numbers in a range from 1 to 456 are used for the cells of public networks, and the numbers in a range from 457 to 504 are used for the CSG cells. A way (method) of dividing codes like this way is not essential to the present invention, and any other appropriate way may be used. However, when the codes are divided in this manner in which the ranges of the numbers are contiguous to each other, it may become possible to easily determine whether the code is for the CSG cells by simply comparing the code with the boundary value (for example, "456" in this case). The boundary value may be individually reported upon the attachment or the TA update of the user equipment or reported via the broadcast channel (BCH). Or, the boundary value may not be reported, (and a value set in advance for the system may be used).

In step S1, the user equipment determines whether the user equipment is entitled to communicate in any of the CSG cells. To perform the cell reselection of a cell contiguous to the serving cell (contiguous cell), the user equipment captures the synchronization channel (SCH) (such as the primary-synchronization channel (P-SCH)) and checks the scramble code of the contiguous cell. In this embodiment, only a certain scramble code is used for the CSG cells and only the other scramble code is used for the non-CSG cells (public cells). When the user equipment is entitled to communicate in any of the CSG cells, the cell search is performed with respect to not only the public cells but also the CSG cells (in step S11). When the user equipment is not entitled to communicate any of the CSG cells, the cell search with respect to the public cells only is performed (in step S12).

After that, with respect to the detected cell, the earlier described processes are performed including the step of determining whether the cell reselection condition is satisfied (step S13). In this embodiment, as soon as the scramble code is checked (confirmed), it may become possible to quickly determine whether there is a possibility the user equipment can connect (communicate) in the cell. Then, a range where the cell search is to be performed can be limited to the cells having a possibility of the user equipment being connected so that the cell search process may be simplified. This may be applies to not only a system serving the user equipment but also the different frequency measurement. Therefore, similar to steps S1, S11, and S12, the range where the cell search is performed may differ in steps S32, S33, and S34 as well.

Seventh Embodiment

Figure 9:
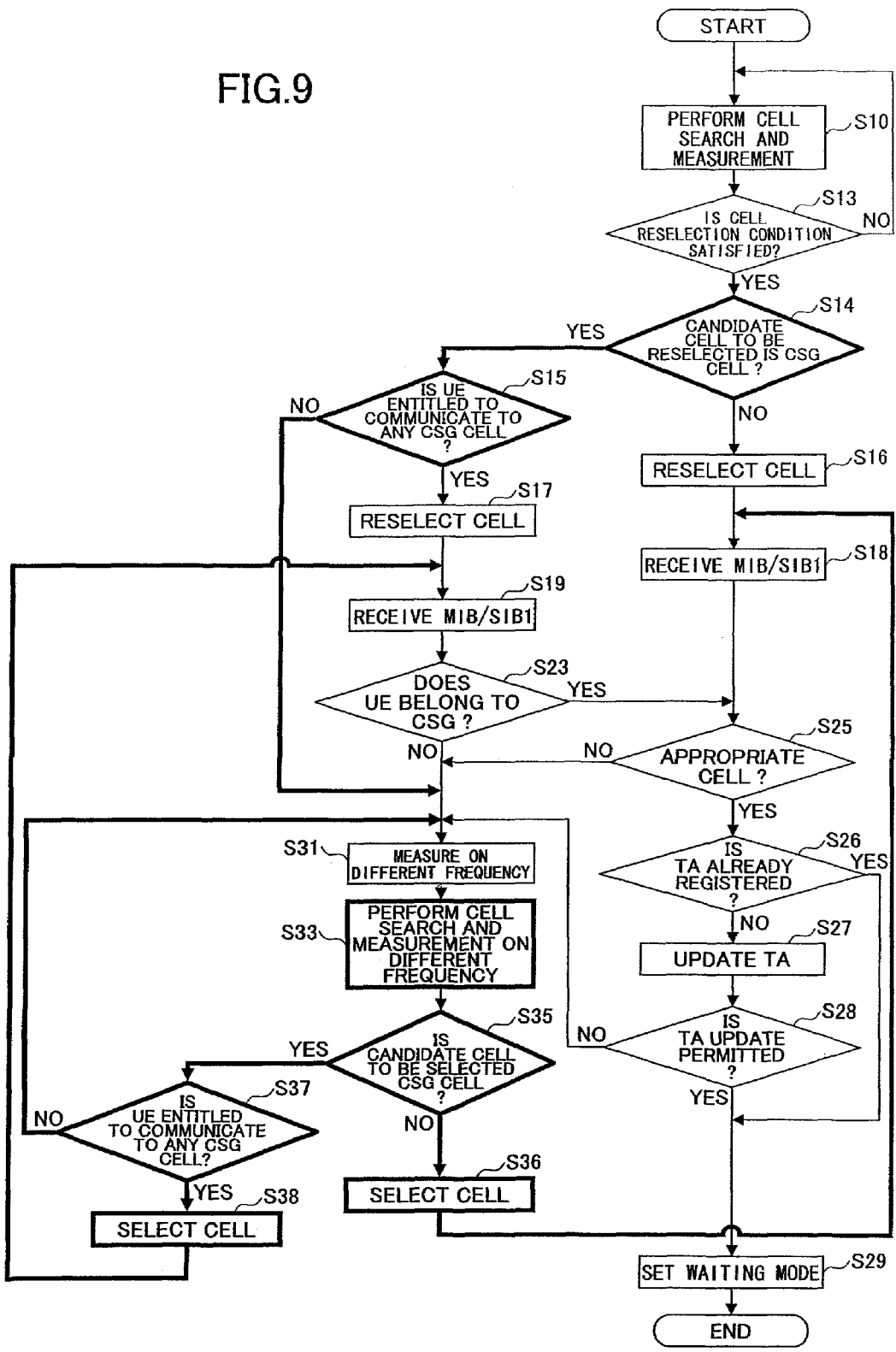
FIG. 9 is a flowchart showing another exemplary method according to an embodiment of the present invention.

FIG. 9 is a flowchart showing another method according to a seventh embodiment of the present invention. In this embodiment, similar to the sixth embodiment, the user equipment determines whether the cell is the CSG cell by checking if the cell ID of the physical layer (such as a scramble code) corresponds to the specific cell ID. In the sixth embodiment, the user equipment changes the range where the cell search is performed depending on whether the user equipment has a right to access any of the CSG cells. By doing this, the process of the cell search may be simplified. This method is effective especially when the macro cell and the CSG cell are operated using different frequencies from each other. However, if the macro cell and the CSG cell are operated uses the same frequency, a high level of interference may occur.

For example, a case as shown in FIG. 6 is described where the cell 1 and the cell 2 are the macro cells and the cell 3 is the CSG cell, and the user equipment having no right to access any CSG cells moves from cell 1 to cell 3. In the method according to the sixth embodiment of the present invention, the cell 3 is not included in the range where the user equipment performs the cell search. As a result, the user equipment may not find (detect) the best CSG cell from the point view of the best receiving quality for the user equipment, and the user equipment may wrongly recognize the cell 2 as the best CSG cell even though the cell 2 provides only secondary best receiving quality for the user equipment. When the user equipment reselects the cell 2 based on the wrong recognition, while communicating, the user equipment may cause harmful interference in the cell 3. Therefore, in this case, preferably, the user equipment does not connect to the cell 2 that is capable of providing only the secondary best receiving quality but the user equipment performs a different frequency measurement. From this point of view, in this embodiment, not only the public cells but also the CSG cells are included in the range where each user equipment performs the cell search.

In step S14, after it is confirmed that the cell reselection condition is satisfied in step S13, the user equipment determines whether the candidate cell to be reselected is the CSG cell. When determining that the candidate cell to be reselected is not the CSG cell, the process goes to step S16, so that the earlier described processes are performed. On the other hand, when determining that the candidate cell to be reselected is the CSG cell, the process goes to step S15.

In step S15, the user equipment determines whether the user equipment is entitled to communicate in any of the CSG cells. When determining that the user equipment is entitled to communicate in any of the CSG cells, the process goes to step S17.

In step S17, the user equipment reselects the candidate cell to be reselected. Then, in step S19, the user equipment receives the broadcast channel (BCH) including MIB, SIB1 and the like.

In step 23, the user equipment determines whether the user equipment belongs to the CSG of the CSG cell. This determination is performed by comparing the tracking area identifications (TA-IDs) related to the CSG cells in which the user equipment is entitled to communicate with the tracking area identifications (TA-IDs) read from the broadcast channel (BCH). When determining that the user equipment belong to the CSG cell, the process goes to step S25, so that the earlier described processes are performed. Otherwise, the process goes to step S31.

On the other hand, in step S15, when determining that the user equipment is not entitled to communicate in any of the CSG cells, the user equipment cannot connect to the reselected cell which is the CSG cell. Therefore, it is not necessary for the user equipment to connect to the candidate cell to be reselected and acquire broadcast information from the broadcast channel (BCH). Therefore, when determining that the user equipment is not entitled to communicate in any of the CSG cells, the process promptly goes to steps S31 and S33 to perform the different frequency measurement. By doing this, the user equipment doesn't have to perform useless cell reselection; therefore, it may become possible for such user equipment to search for the appropriate cell for the user equipment quickly.

The above described operations of steps S14 through S17 in which the user equipment determines whether the cell to be reselected is the CSG cell before the cell reselection may be also applied to the cell search process in the system using different frequencies.

In step S33, the cell search and the measurement on a different frequency are performed. When a candidate cell to be selected is found, the process goes to step S35 (when no candidate cell to be selected is found, a notification that the user equipment is in a no service area may be given to the user equipment and the process may end).

In step S35, the user equipment determines whether the candidate cell to be selected is the CSG cell. In this case, as well, the determination may be performed by checking if the scramble code of the candidate cell to be selected corresponds to a predetermined code. When determining that the candidate cell to be selected is not the CSG cell, the candidate cell to be selected is the public cell and therefore, the user equipment can select any candidate cell, and selects the candidate cell to be selected (in step S36). Then, the process goes to step S18, so that the earlier described processes are performed.

In step S37, after the user equipment determines that the candidate cell to be selected is the CSG cell in step S35, the user equipment determines whether the user equipment has a right to access any of the CSG cells (in step S37). When determined that the user equipment has a right to access any of the CSG cells, the user equipment selects the candidate cell to be selected which is the CSG cell (in step S38), and the process goes to step S19, so that the earlier described processes are performed. On the other hand, when determining that the user equipment does not have any right to access any of the CSG cells, the process goes back to steps S31 and S33 to perform the cell search on a different frequency and the like (in this case, the user equipment may go back to the previous system or go into a new system)

The present invention is described above by referring to a specific embodiment. However, a person skilled in the art may understand that the above embodiment is described for illustrative purpose only and may think of examples of various modifications, transformations, alterations, changes, and the like. To promote an understanding of the present invention, the specific values are used as examples throughout the description. However, it should be noted that such specific values are just sample values unless otherwise described, and any other values may be used. In the above description, the present invention is described by being divided into several embodiments. However, it should be noted that the division of the present invention into several embodiments is not an essential element of the present invention. For example, two or more embodiments may be combined on as as-needed basis. For illustrative purposes, the apparatus according to an embodiment of the present invention is described with reference to the functional block diagram. However, such an apparatus may be provided by hardware, software, or a combination thereof. As an element of the apparatus according to an embodiment of the present invention, one or more elements may be provided as one part, and the apparatus may include more or fewer elements than the elements described or an additional element. As operations of the method according to an embodiment of the present invention, the operations may include more or less steps described or an additional step. The present invention is not limited to the embodiment described above, and various modifications, transformations, alteration, exchanges, and the like may be made without departing from the scope and spirit from the present invention.

The present international application claims priority from Japanese Patent Application No. 2007-000807 filed on Jan. 5, 2007, the entire contents of which are hereby incorporated herein by reference.

The invention claimed is:

1. A user equipment to be used in a mobile communication system, comprising:
    an acquiring unit configured to receive broadcast information from a base station and acquire common identification information indicating whether a cell of the base station is a private network based on the broadcast information;
    a determination unit configured to, if the cell of the base station is for a private network, determine whether the user equipment is entitled to communicate in the private network; and
    a transmission unit configured to, when a tracking area for the cell of the base station is not a tracking area for the user equipment, transmit a signal for requesting update of the tracking area to the base station,
    wherein common identification information indicating that the cell of the base station is a private network indicates a value within one numeral range and common identification information indicating that the cell of the base station is not a private network indicates a value within another numeral range.

2. The user equipment according to claim 1, wherein
    the common identification is expressed by any number within a predetermined range of numbers and an indicator indicating any number within the predetermined range of numbers is contained in the broadcast information.

3. The user equipment according to claim 2, wherein
the determination unit determines whether the user equipment is entitled to communicate in the private network by determining whether a broadcast identification of the private network is the same as or different from an identification of the private network in which the user equipment is entitled to communicate.

4. The user equipment according to claim 1, wherein
the determination unit determines whether the user equipment is entitled to communicate in the private network by determining whether a broadcast private network identification is the same as or different from an identification of the private network in which the user equipment is entitled to communicate.

5. The user equipment according to claim 1, wherein
the common identification information is contained in a system information block (SIB) in the broadcast information.

6. The user equipment according to claim 2, wherein
the common identification information is contained in a system information block (SIB) in the broadcast information.

7. The user equipment according to claim 3, wherein
the common identification information is contained in a system information block (SIB) in the broadcast information.

8. The user equipment according to claim 4, wherein
the common identification information is contained in a system information block (SIB) in the broadcast information.

9. The user equipment according to claim 1, wherein
the cell of the base station is a cell selected by cell reselection, and the cell reselection is carried out after determination whether the private network is to be added through cell search.

10. A method used in a user equipment in a mobile communication system, comprising the steps of:
receiving broadcast information from a base station and acquiring common identification information indicating whether a cell of the base station is a private network based on the broadcast information;
if the cell of the base station is a private network, determining whether the user equipment is entitled to communicate in the private network; and
when a tracking area for the cell of the base station is not a tracking area for the user equipment, transmitting a signal for requesting update of the tracking area to the base station,
wherein common identification information indicating that the cell of the base station is a private network indicates a value within one numeral range and common identification information indicating that the cell of the base station is not a private network indicates a value within another numeral range.

11. The method according to claim 10, wherein
the common identification is expressed by any number within a predetermined range of numbers and an indicator indicating any number within the predetermined range of numbers is contained in the broadcast information.

12. The method according to claim 11, wherein
the determination step determines whether the user equipment is entitled to communicate in the private network by determining whether a broadcast identification of the private network is the same as or different from an identification of the private network in which the user equipment is entitled to communicate.

13. The user equipment according to claim 10, wherein
the determination step determines whether the user equipment is entitled to communicate in the private network by determining whether a broadcast private network identification is the same as or different from an identification of the private network in which the user equipment is entitled to communicate.

14. The method according to claim 10, wherein
the common identification information is contained in a system information block (SIB) in the broadcast information.

15. The method according to claim 11, wherein
the common identification information is contained in a system information block (SIB) in the broadcast information.

16. The method according to claim 12, wherein
the common identification information is contained in a system information block (SIB) in the broadcast information.

17. The method according to claim 13, wherein
the common identification information is contained in a system information block (SIB) in the broadcast information.

18. The method according to claim 10, wherein
the cell of the base station is a cell selected by cell reselection, and the cell reselection is carried out after determination whether the private network is to be added through cell search.

* * * * *